United States Patent
Zhang et al.

(10) Patent No.: US 10,134,135 B1
(45) Date of Patent: Nov. 20, 2018

(54) SYSTEM AND METHOD FOR FINDING OPEN SPACE EFFICIENTLY IN THREE DIMENSIONS FOR MOBILE ROBOT EXPLORATION

(71) Applicant: HRL Laboratories, LLC, Malibu, CA (US)

(72) Inventors: Lei Zhang, Torrance, CA (US); Kyungnam Kim, Oak Park, CA (US); Deepak Khosla, Camarillo, CA (US); Jiejun Xu, Chino, CA (US)

(73) Assignee: HRL Laboratories, LLC, Malibu, CA (US)

( * ) Notice: Subject to any disclaimer, the term of this patent is extended or adjusted under 35 U.S.C. 154(b) by 50 days.

(21) Appl. No.: 15/249,655

(22) Filed: Aug. 29, 2016

Related U.S. Application Data

(60) Provisional application No. 62/210,861, filed on Aug. 27, 2015.

(51) Int. Cl.
*G06K 9/00* (2006.01)
*G06T 7/00* (2017.01)

(52) U.S. Cl.
CPC .. *G06T 7/0042* (2013.01); *G06T 2207/10028* (2013.01); *G06T 2207/20024* (2013.01); *Y10S 901/19* (2013.01)

(58) Field of Classification Search
USPC .......................................................... 382/153
See application file for complete search history.

(56) References Cited

U.S. PATENT DOCUMENTS

| | | | | |
|---|---|---|---|---|
| 2006/0167599 A1* | 7/2006 | Bodin | ................. | G08G 5/0069 701/16 |
| 2011/0093191 A1* | 4/2011 | Trovato | ............... | G06Q 10/047 701/533 |
| 2011/0241616 A1* | 10/2011 | Kim | ........................ | H02J 7/025 320/108 |
| 2013/0060421 A1* | 3/2013 | Kadowaki | ............ | B62D 15/027 701/36 |

(Continued)

OTHER PUBLICATIONS

Rusu, R. & Cousins, S. (2011), "3D is here: Point Cloud Library (PCL) ", in Robotics and Automation (ICRA), 2011 IEEE International Conference, pp. 1-4.

(Continued)

*Primary Examiner* — Jerome Grant, II
(74) *Attorney, Agent, or Firm* — Tope-McKay & Associates

(57) ABSTRACT

Described is a system for finding open space for robot exploration. During operation, the system designates a straight forward direction as a default direction. It is determined if a filtered 3D point cloud has a sufficient number of cloud points. If not, the system determines if an obstacle is too close in a previous time. If so, a backward direction is set as a target direction and if not, the straight forward direction is set as the target direction. Alternatively, if there are a sufficient number of points, then calculate a distance of each point to a sensor center and determine if a number of times that the distance is smaller than a distance threshold is greater than a fixed number. The system either sets the backward direction as the target direction or estimates an openness of each candidate direction until a candidate direction is set as the target direction.

22 Claims, 8 Drawing Sheets

(56) References Cited

U.S. PATENT DOCUMENTS

| | | | | |
|---|---|---|---|---|
| 2013/0135707 A1* | 5/2013 | Lopez | ............... | G01S 5/16 359/291 |
| 2015/0251656 A1* | 9/2015 | Yester | ............... | B60W 30/09 701/41 |
| 2015/0334562 A1* | 11/2015 | Perold | ............... | H04W 12/04 713/171 |
| 2016/0378121 A1* | 12/2016 | Shue | ............... | G05D 1/105 701/7 |
| 2017/0161910 A1* | 6/2017 | Aghamohammadi | .. | G06T 7/208 |
| 2017/0229022 A1* | 8/2017 | Gurel | ............... | G08G 5/006 |
| 2017/0357273 A1* | 12/2017 | Michini | ............... | G05D 1/101 |

OTHER PUBLICATIONS

Intel Corporation, "Intel® NUC with Intel® vPro™ Technology (DC53427HYE)", http://www.intel.com/content/dam/www/public/us/en/documents/product-briefs/nuc-kit-dc53427hye-brief.pdf downloaded on Oct. 18, 2016.
The Robot Operating System (ROS), found at www.ros.org/about-ros/. downloaded on Oct. 18, 2016.
Patrick Mihelich, "openni_launch ROS package", found at wiki.ros.org /openni_launch. downloaded on Oct. 18, 2016.
ASUSTeK Computer Inc., Xtion PRO, found at asus.com /Multimedia/Xtion_PRO/. downloaded on Oct. 18, 2016.
Dave Hershberger, Josh Faust, "rviz ROS package", found at wiki.ros. org/rviz . downloaded on Oct. 18, 2016.
Nate Koenig, Andrew Howard, etc., "gazebo ROS package", found at wiki.ros.org/gazebo. downloaded on Oct. 18, 2016.
Srikanth Saripalli, Sai Vemprala, Shatadal Mishra, "SafeFlight micro aerial vehicle", http://www.personal-drones.net/tag/safellight-copters/ downloaded on Oct. 18, 2016.
DJI F550 GPS Drone, found at helipal.com/dji-flamewheel-f550-w-naza-v2-gps-drone-rtf.html. downloaded on Oct. 18, 2016.
Simon Zigg, Davide Scaramuzza, Stephan Weiss, Roland Siegwart, "MAV Navigation through Indoor Corridors Using Optical Flow", ICRA 2010, pp. 1-8.
Stephane Ross et al., "Learning Monocular Reactive UAV Control in Cluttered Natural Environments", CoRR abs/1211.1690, 2012, pp. 1-8.

* cited by examiner

SYSTEM AND METHOD FOR FINDING OPEN SPACE EFFICIENTLY IN THREE DIMENSIONS FOR MOBILE ROBOT EXPLORATION

GOVERNMENT RIGHTS

This invention was made with government support under U.S. Government Contract Number Synapse HR011-09-C-0001. The government has certain rights in the invention.

CROSS-REFERENCE TO RELATED APPLICATIONS

This is a non-provisional patent application of 62/210,861, filed on Aug. 27, 2015, the entirety of which is hereby incorporated by reference.

BACKGROUND OF INVENTION

(1) Field of Invention

The present invention is related to a system for finding open space efficiently in three dimensions and, more specifically, to a system for finding open space to facilitate mobile robot exploration.

(2) Description of Related Art

Many techniques toward autonomous indoor robot navigation have been developed in the past. One of the major research areas focuses on addressing the Simultaneous Localization and Mapping (SLAM) problem, which aims to localize the robot and reconstruct the map from its trajectory. Some recent approaches in this area have started to utilize three-dimensional (3D) range sensors in conjunction with point cloud alignment for autonomous robot navigation. While such prior art may be operable for mapping trajectories, it does not address the important question of where the robot should go next and explore.

Another related area is obstacle avoidance. Due to the growing interests in smaller unmanned aerial vehicles (UAVs) flying in indoor and other global positioning satellite (GPS) denied environments, several navigation techniques have been developed to utilize onboard visual sensors to ensure safe maneuver in such challenging conditions. Techniques focusing on monocular cameras have long been the mainly studied topic. This includes an optical flow based approach by Zingg et al. (See the List of Incorporated Literature References, Literature Reference No. 10) and an imitation learning based approach by Ross et al. (See Literature Reference No. 11). Similar to the SLAM work, researchers also started to investigate utilizing Light Detection and Ranging (LIDAR) or other RGB-D sensors for obstacle avoidance. However, regardless of using monocular vision or 3D vision, a common theme across the prior art on obstacle avoidance is the reactive action control for robots. In other words, this means that the control system should react and prevent a robot from colliding with an obstacle when it is close by. However, such systems do not plan ahead for opportunity spaces which are further away and can be explored.

Thus, a continuing need exists for a system that proactively searches for open spaces (opportunity spaces) to facilitate mobile robot exploration.

SUMMARY OF INVENTION

This disclosure provides a system for finding open space to facilitate mobile robot exploration. In various embodiments, the system includes one or more processors and a memory. The memory is a non-transitory computer-readable medium having executable instructions encoded thereon, such that upon execution of the instructions, the one or more processors perform several operations, including:

designating a straight forward direction in front of a sensor center as a default moving direction;
determining if a filtered three-dimensional (3D) point cloud has a sufficient number of cloud points for further processing;
    if the filtered point cloud has an insufficient number of cloud points, then determining if an obstacle is too close in a previous K time, such that if so, a backward direction is set as a target direction and if not, then the straight forward direction is set as the target direction;
    if the filtered point cloud does have a sufficient number of cloud points, then continuing;
calculating a distance $d_c$ of each point to the sensor center, determining if a number of times M that distance $d_c$ is smaller than a distance threshold $D_{min}$ is greater than a fixed number $K_1$;
    if M is greater than the fixed number $K_1$, then the backward direction is set as the target direction;
    if M is smaller than the fixed number $K_1$, then continuing; and
estimating an openness of each candidate direction until a candidate direction is designated as open and set as the target direction or all candidate directions have been checked for openness, with the backward direction being set as the target direction.

In another aspect, estimating the openness of each candidate direction further comprises operations of:
calculating a minimum distance $d_{min}$ of the cloud points to a directional vector,
determining if $d_{min}$ is smaller than a distance threshold r;
    if $d_{min}$ is greater than the distance threshold r, then the candidate direction is designated as open and set as the target direction;
    if $d_{min}$ is smaller than the distance threshold r, then the candidate direction is designated as blocked and continuing;
determining if all candidate directions have been checked for openness; if all candidate directions have not been checked for openness,
then continuing estimating openness until a candidate direction is designated as open and set as the target direction or all candidate directions have been checked for openness; and
    if all candidate directions have been checked for openness, then setting the backward direction as the target direction.

In yet another aspect, in estimating the openness of each candidate direction, the candidate directions are estimated in an order of $[0°, -1°, 1°, -2°, 2°, \ldots, -\Theta_{max}, \Theta_{max}]$, where an angular separation is 1° to find a next candidate direction.

Further, in determining if $d_{min}$ is smaller than the distance threshold r, the distance threshold r is a radius as measured across the mobile platform.

In another aspect, the system generates the filtered 3D point cloud.

In yet another aspect, generating the filtered 3D point cloud further comprises operations of:
filtering a raw 3D point cloud according to vertical coordinates in a sensor coordinate system such that any 3D point whose vertical coordinates are beyond a predetermined range are filtered out, resulting in vertically filtered 3D points;

filtering the vertically filtered 3D points based on a distance to the sensor center, such that 3D points having a distance above a maximum distance $T_1$ are filtered out, resulting in vertically and distance filtered 3D points; and filtering the vertically and distance filtered 3D points based on voxel grid filtered, resulting in the filtered 3D point cloud.

In yet another aspect, the system performs an operation of executing a move command to cause the mobile platform to move in the target direction.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
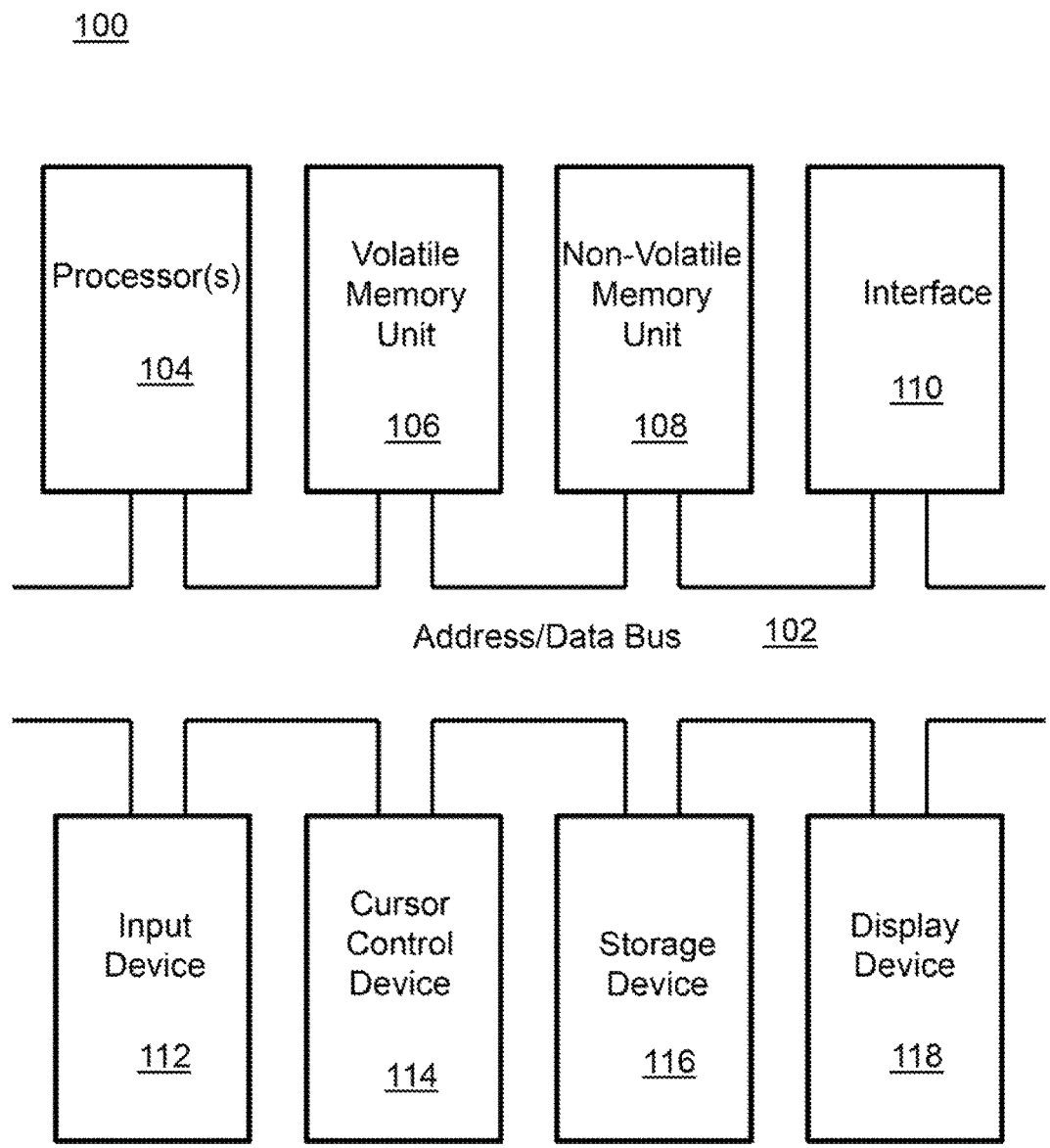
FIG. 1 is a block diagram depicting the components of a system according to various embodiments of the present invention.

The present invention is related to a system for finding open space efficiently in three dimensions and, more specifically, to a system for finding open space to facilitate mobile robot exploration. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Subsequently, an introduction provides the reader with a general understanding of the present invention. Finally, specific details of various embodiment of the present invention are provided to give an understanding of the specific aspects.

(1) List of Incorporated Literature References

The following references are cited throughout this application. For clarity and convenience, the references are listed herein as a central resource for the reader. The following references are hereby incorporated by reference as though fully set forth herein. The references are cited in the application by referring to the corresponding literature reference number, as follows:

1. Rusu, R. & Cousins, S. (2011), "3D is here: Point Cloud Library (PCL)", in 'Robotics and Automation (ICRA), 2011 IEEE International Conference, pp. 1-4.
2. Intel Corporation (2014), "Intel® NUC with Intel® vPro™ Technology (DC53427HYE)", found at intel.com/content/www/us/en/nuc/overview.html.
3. The Robot Operating System (ROS), found at www.ros.org/about-ros/.
4. Patrick Mibelich, "openni_launch ROS package", found at wiki.ros.org/openni_launch.
5. ASUSTeK Computer Inc., Xtion PRO, found at asus.com/Multimedia/Xtion_PRO/.
6. Dave Hershberger, Josh Faust, "rviz ROS package", found at wiki.ros.org/rviz.
7. Nate Koenig, Andrew Howard, etc., "gazebo ROS package", found at wiki.ros.org/gazebo.
8. Srikanth Saripalli, Sai Vemprala, Shatadal Mishra, "Safe-Flight micro aerial vehicle", found at robotics.asu.edu/.
9. DJI F550 GPS Drone, found at helipal.com/dji-flame-wheel-f550-w-naza-v2-gps-drone-rtf.html.
10. Simon Zigg, Davide Scaramuzza, Stephan Weiss, Roland Siegwart, "MAV Navigation through Indoor Corridors Using Optical Flow", ICRA 2010.

11. Stephane Ross et al., "Learning Monocular Reactive UAV Control in Cluttered Natural Environments", CoRR abs/1211.1690, 2012.

(2) Principal Aspects

Various embodiments of the invention include three "principal" aspects. The first is a system for finding open space efficiently in three dimensions for mobile robot exploration. The system is typically in the form of a computer system (e.g., one or more processors, etc.) operating software or in the form of a "hard-coded" instruction set and may include the relevant sensors, actuators, and mobile platform components as may be necessary to implement the system. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior as applicable to a mobile platform, such as described herein. In a desired aspect, the one or more processors and other components of the computer system 100 are located on or otherwise mounted to the mobile platform such that generated commands are sent to the various components (motors, actuators, etc.) of the mobile platform to cause the mobile platform to attempt to achieve the generated commands.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
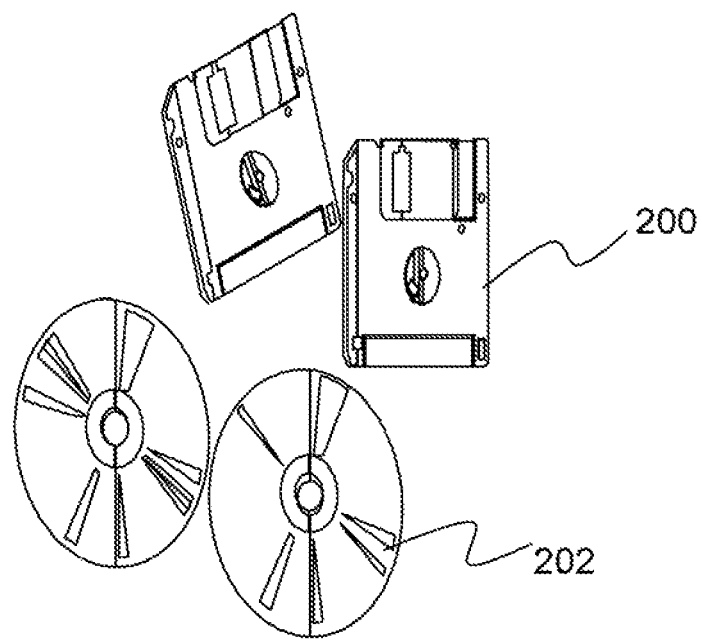
FIG. 2 is an illustration of a computer program product embodying an aspect of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Introduction

This disclosure provides a system to efficiently find an open space/direction for a mobile platform (e.g., mobile robot, such as an unmanned aerial vehicle (UAV)) by processing point cloud data from a front-facing three-dimensional (3D) sensor mounted on the robot. The open space/direction is detected to allow the mobile robot to navigate without hitting obstacles. Starting from the zero degree direction (i.e., straight forward), the system begins by attempting to find a direction that satisfies the "openness" requirement. The next candidate directions are chosen by increasing the angles (to either the left or right) from the default direction until either an open space is found or the range limitation is reached. If a direction is found as being open, it will be set as the target direction and output for controlling the movement of the mobile platform. If all directions are blocked, a backward direction will be set as the target direction for movement. In a desired aspect, the system is located on or otherwise mounted to the mobile platform such that generated movement commands (e.g., move to the target direction) are sent to the various components (motors, actuators, etc.) of the mobile platform to cause the mobile platform to attempt to achieve the generated commands. An efficient version that evaluates on a compressed representation of 3D input data and provides the output without major loss of quality is also proposed.

The ability to explore unknown places is an essential component for an autonomous robot system. Mobile platforms need perception capabilities to guide them to autonomously navigate through an indoor environment and do path planning to minimize energy consumption and maximize the explored areas. The basic problem is the following: after being deployed into an unknown environment, a robot must perform sensing operations continuously to decide the next exploration location, and possibly maintain an internal representation of the environment. A well-studied and related problem is the Simultaneous Localization and Mapping (SLAM) problem, where the goal is to integrate the information collected during navigation into an accurate map. However, SLAM does not address the question of where the robot should go next. The system as described herein addresses such a problem. Specifically, attention is focused on an indoor environment such as corridors or warehouses. In such a setting, the next "good" candidate positions to explore typically refer to where the open spaces are. To this end, this disclosure provides a robust and efficient system to identify open spaces for indoor robot exploration.

As can be understood by those skilled in the art, the system described herein has many applications and can be implemented in a variety of platforms. As a non-limiting example, the system can be used to augment the capabilities of UAV/unmanned ground vehicle (UGV) smart surveillance and fast exploration. The system can also be implemented in automobiles for autonomous driving and active safety. Other applicable domains include 3D object detection and recognition and automated assembly lines.

To summarize, the system described herein provides for rapid online detection of a heading direction for navigation of unknown areas while avoiding obstacles. The system is operable for processing 3D data only while not being affected by changing lighting conditions. The system includes a robust algorithm maintaining a high degree of tolerance to cluttered indoor scenes while having low computational and storage requirements. Specific details regarding the system provided below.

(4) Specific Details of Various Embodiments

Figure 3:
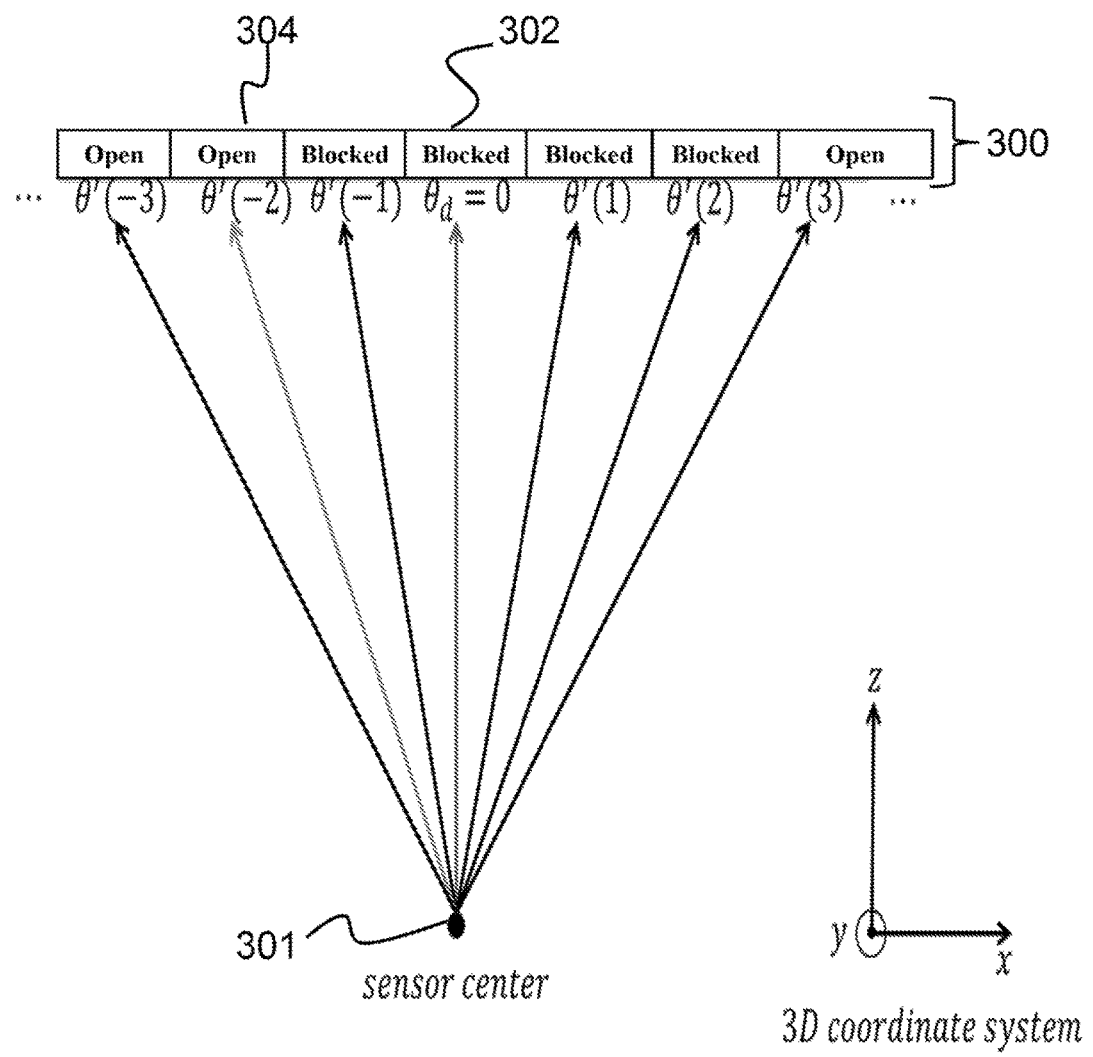
FIG. 3 is an illustration depicting a process for searching for an open space direction for a mobile platform according to various embodiments of the present invention.

The basic idea of the 3D open space finding process is to find an open direction out of a range of yaw directions that a mobile platform (e.g., robot, such as a UAV) can navigate to. The 3D point cloud from an input sensor is first pre-processed to filter out points out of the maximum X, Y, and Z ranges and then used for finding the open space. FIG. 3 illustrates the concept of finding an open space in 3D.

It should be understood that although a "UAV" is used in this disclosure for illustrative purposes as an example mobile robot, the invention is not intended to be limited thereto and can be implemented in any mobile platform. Depending on the 'open' yaw direction, the UAV is controlled to move/turn to left or right while exploring an unknown environment. As shown in FIG. 3, the default moving direction is set as moving forward, i.e., $\theta d=0°$. The candidate yawing direction $\theta'$ is discretized by an interval of N degree (N can range from 1 to 5). In other words, the yawing directions are segmented into N blocks 300. Starting from the zero degree direction 302 in front of the sensor center 301 (e.g., a sensor positioned on the mobile platform), the algorithm of the present invention tries to find a block that satisfies the "openness" requirement. The next candidate direction is getting further away from the default moving direction until either an open space is found or the range limitation is reached. If a block is found open 304, it will be set as the target direction and output for controlling the UAV movement. If all directions are blocked, a backward direction will be issued. Further details are provided below.

(4.1) Point Cloud Pre-Processing

Figure 5:
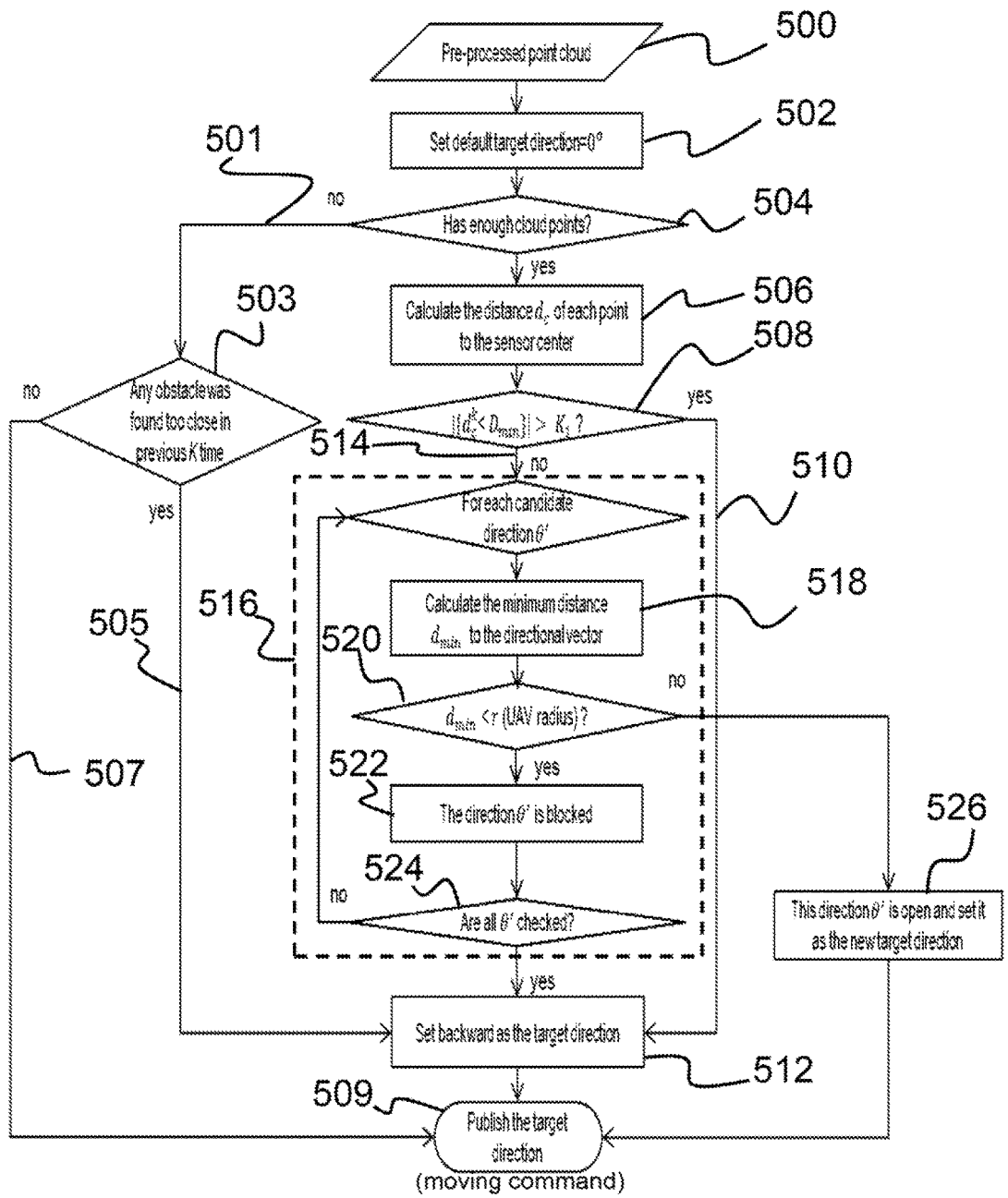
FIG. 5 is a flowchart depicting a process for finding an open space according to various embodiments of the present invention.

As shown in FIG. 5, the system first pre-process the point cloud 500. The 3D point cloud from the input sensor is first processed by a sequence of filtering processes to reduce the number of 3D points that need to be considered for the open space finding procedure.

First, the raw 3D point cloud is filtered according to the vertical coordinates in the sensor coordinate system. Any point whose vertical coordinate (i.e., y-coordinate) is beyond the range [$y_{min}$, $y_{max}$] will be filtered out. A non-limiting example of such a range includes one meter.

Second, the filtered 3D points from the previous step are filtered again by their distances to the sensor center. Any point whose distance to the sensor center is above a maximum distance $T_1$ will be filtered out. A non-limiting example of such a maximum distance $T_1$ includes five meters. For higher-speed flights (e.g., greater than 10 m/sec), this distance may be even larger (e.g., 10 m) to allow enough time for the UAV to change course and avoid collision.

Third, the filtered point cloud from the previous steps is then filtered by voxel grid filtering (See Literature Reference No. 1). As a non-limiting example, a voxel of 5 cm×5 cm×5 cm is used for filtering. This is a down-sampling process that will significantly reduce the number of points for subsequent processing. A down-sampling rate is usually set around 40-70 times, which has been observed to works as well as no down-sampling for the task of open space finding.

(4.2) Open Space Finding

The straight-forward direction (i.e., θ=0°) is initially set 502 as the default moving direction. The default direction can be set otherwise depending on the high-level navigation module of the robot. The next moving direction is where the first "open space" can be found using the algorithm described below.

To find an open space using the filtered point cloud generated from the above pre-processing steps 502, a first check is made to determine if there are enough cloud points 504 in the pre-processed point cloud even before going through all the possible navigation directions to find an open one. If the number of cloud points NI is smaller 501 than a fixed percentage (e.g., 30%) of the maximum number of original point cloud that is set by the sensor resolution, this means either a pure open space or the sensor is completely blocked. To differentiate these two cases, a check 503 is rendered to see if any point cloud was found to be too close to the sensor center in the last T seconds (e.g., T=10). If so 505, then most likely the sensor was completely blocked by the obstacle and a backward command 512 will be issued. Otherwise 507, it is pure open space and defined as the target direction, and the UAV is set to move 509 toward the default target direction.

In order to check 503 if the observed point cloud is too close to the sensor center, the system calculates 506 the distance $d_c$ of each point to the sensor center and counts the number of times M when $d_c$ is smaller than a distance threshold $D_{min}$.

$$M=|\{d_c^k < D_{min} | k=1,2,\ldots\}|,$$

where || is the cardinality operator. Based on that, the system determines 508 if M is greater than a fixed number $K_1$. If M is greater 510 than the fixed number $K_1$ (e.g., 10), the point cloud is too close to the UAV and a "backward" command 512 is output to ask the UAV to move backward to avoid collision. Its clock time when the backward command is issued is recorded in the history and used by the above part of the algorithm.

Figure 4:
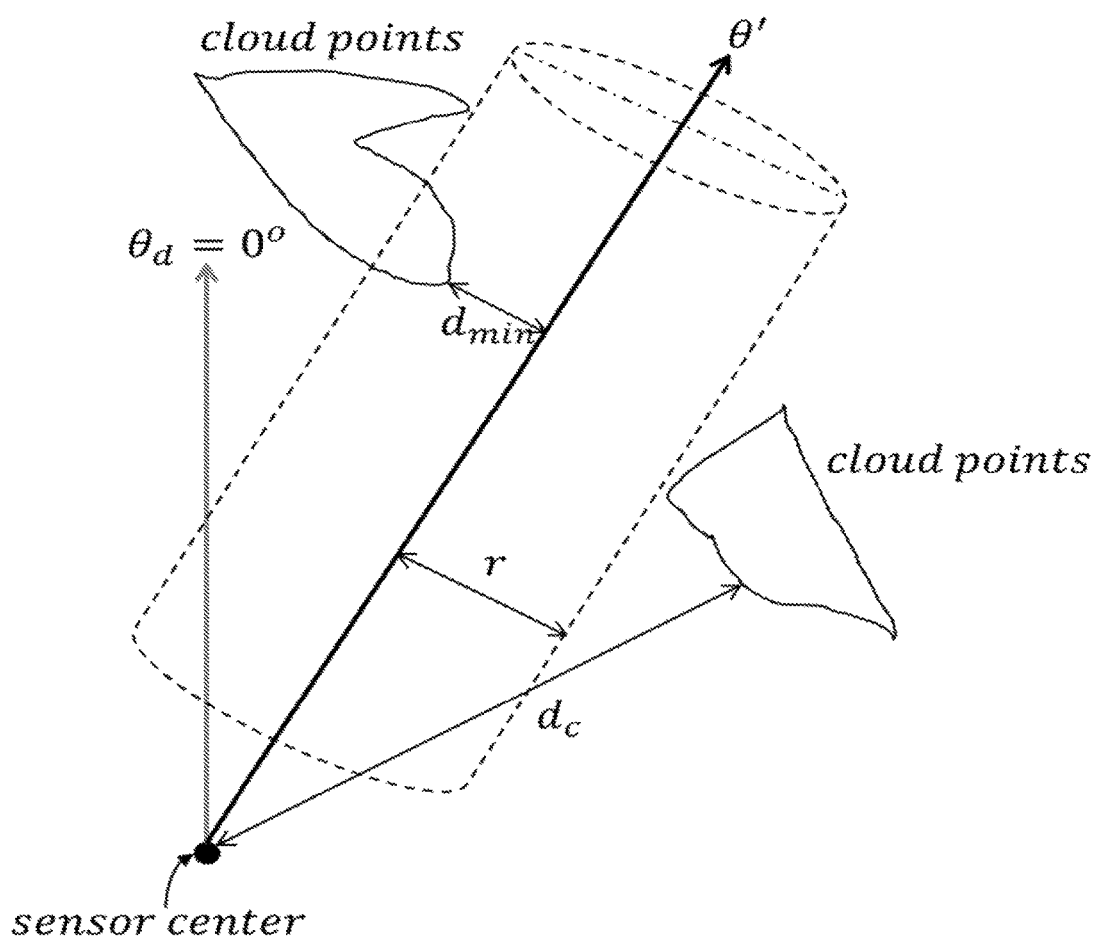
FIG. 4 is an illustration depicting a process of estimating the openness of a candidate direction θ' according to various embodiments of the present invention.

If the UAV is not 514 too close to the observed point cloud or does not face a pure open space (i.e., element 507), the "openness" of each candidate direction is estimated 516 in the order of [0°, −1°, 1°, −2°, 2°, . . . , −Θ$_{max}$, Θ$_{max}$], where the angular separation is 1°, to find the next target direction to go. FIG. 4 and the flowchart in FIG. 5 explain and depict the estimation 516 of the openness of a candidate direction θ'.

For the chosen candidate direction, the system calculates 518 the distance of each point to the directional vector, i.e. the vector starting from the sensor center and pointing toward the yawing direction θ'. The minimum $d_{min}$ of such distances is then found after evaluating all points. If $d_{min}$ is smaller than a distance threshold r 520, which is usually the radius of the UAV, this direction is blocked 522.

$$\theta' \text{ is} \begin{cases} \text{blocked} & \text{if } d_{min} < r; \\ \text{open} & \text{otherwise.} \end{cases}$$

The process continues 524 until all θ' are checked. Whenever θ' is found "open" (i.e., $d_{min}$ is greater than the distance threshold) it is set as the next target direction 526 and a moving command 509 is issued to move to the target direction. If all potential directions are found "blocked", then a backward command 512 is issued. The backward command 512 is, for example, a command that causes the UAV to move incrementally backwards, such as one foot, one meter, etc. (as predefined).

(4.3) Efficient/Simplified Open Space Finding

Figure 6:
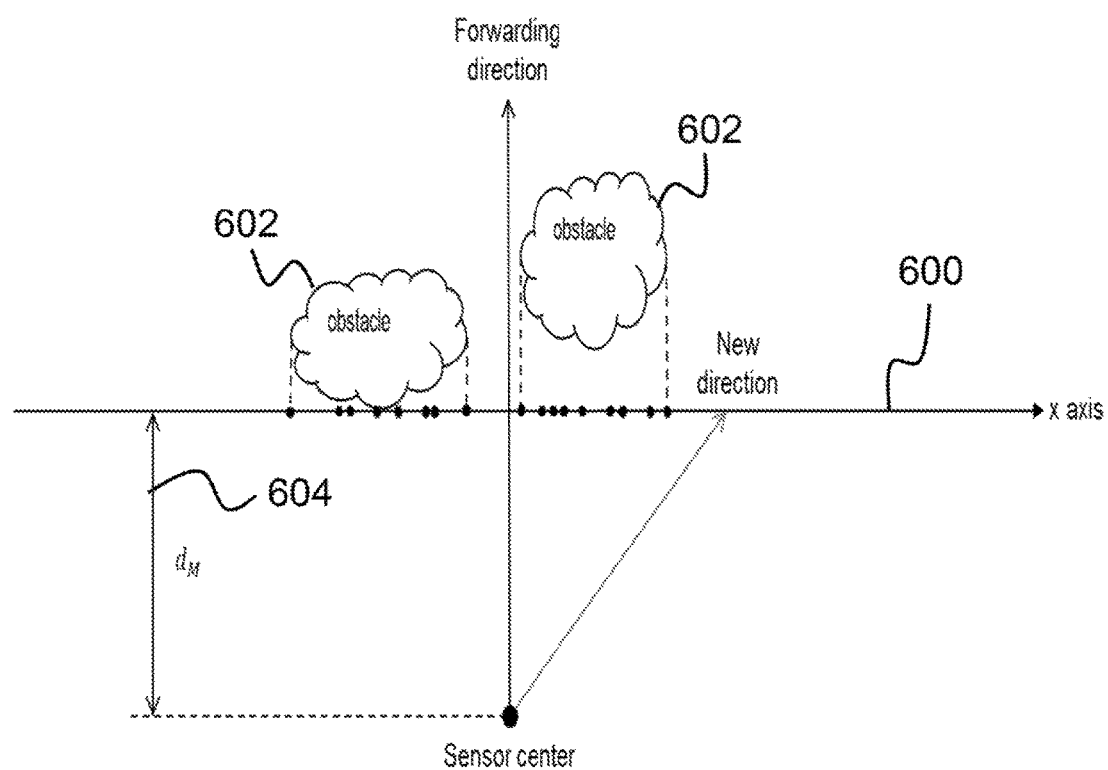
FIG. 6 is an illustration depicting a simplified open space as found using an approximation based on x-coordinates.

The above open space finding process needs to calculate 3D distance for each point in the filtered point cloud. In order to further reduce the computation and improve its efficiency, an efficient/simplified version of the open space finding process is also described, that approximately estimates the "openness" of yawing directions using x-coordinates of those cloud points. The assumption for such an approach is that the UAV does not have significant roll and pitch movements during the flight. As a result, there is little need for concern about the movement in the y-coordinate and focus only on the heading direction (i.e., the yaw angle). In such cases and as shown in FIG. 6, the x-coordinates 600 of cloud points 602 and their z-coordinates 604 can be used to approximately estimate the necessary heading direction to avoid those cloud points 602.

Compared to the "full" version of the open space finding process as depicted in FIG. 5, only the parts enclosed in the estimation process (depicted as element 516 in FIG. 5) need to be changed. The filtered cloud points from the point cloud pre-processing steps are first ordered according to their x-coordinates. The x-axis in the range [−X$_{min}$, X$_{max}$] is split evenly into small segments with a fixed interval (e.g., 0.1 m). For a single segment defined as the range [−x$_{low}$, x$_{up}$], if there is a cloud point whose x-coordinate falls into this range, this segment is "blocked". Otherwise it is "open". After all segments are labeled as "blocked" or "open", a search is begun for the first set of consecutive segments that are all open, close to the forwarding direction (θ=0°), and their span in the x-axis is greater than the UAV's diameter. If such a set of consecutive segments can be found, their centroid's x-coordinate $x_c$ will be used to estimate the new moving direction $\theta_{New}$ according to $$\theta_{New} = \left\lfloor \arctan\left(\frac{x_c}{d_M}\right) - 0.5 \right\rfloor,$$

where $d_M$ is the minimum z-coordinate from all points after the point cloud pre-processing steps and $\lfloor \ \rfloor$ is the floor rounding operator.

(4.4) Implementation and Experiments in Practice

The 3D open space finding process according to various embodiments of the present disclosure were implemented and evaluated on both a laptop (with Intel® Core™ i7-2860QM CPU at 2.5 GHz) and a light-weight computing unit called Intel NUC (next unit of computing) (see Literature Reference No. 2). The NUC has an Intel® Core™ i5-3427U processor that is dual core and runs at 1.8 GHz. The central processing unit (CPU) on the NUC consumes about 17 W energy. With about 2.2 lb weight (with the case), the NUC is appropriate for usage on a UAV. Prototype software was built under the robotic operating system (ROS) environment (see Literature Reference No. 3). For the input, the point cloud generated by the openni_launch ROS package (see Literature Reference No. 4) was used, using an ASUS Xtion Pro sensor (see Literature Reference No. 4).

The process was first tested using a mobile cart. The Xtion Pro sensor was mounted on the cart and the operator pushed the cart to move around an indoor environment. Using the rviz ROS package (See Literature Reference No. 6), 3D point clouds and a 3D arrow that points from the sensor center toward the estimated target direction could be displayed. By visual inspection of its performance during the live tests, it was observed that the process accurately generated correct moving target directions.

Figure 7A:
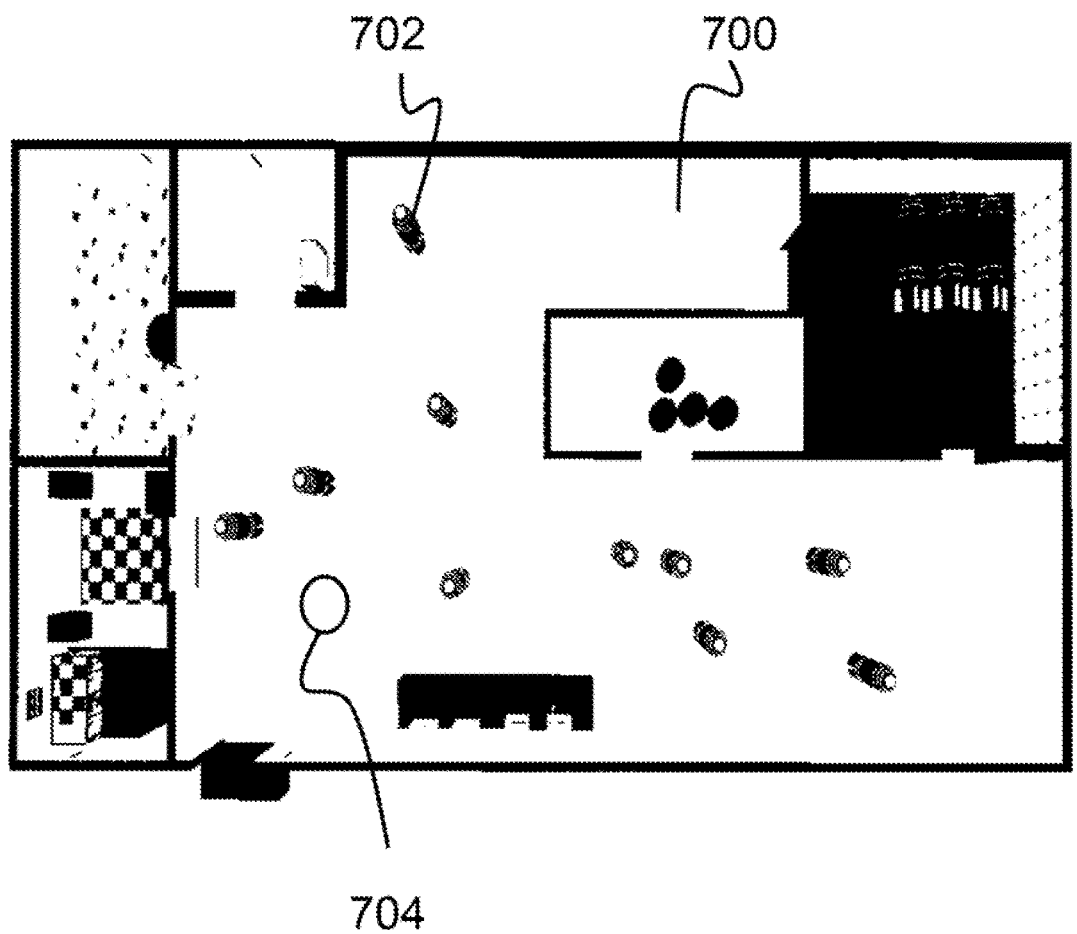
FIG. 7A is an illustration depicting a layout of a simulated warehouse in which a flight simulation of the process described herein was tested.
Figure 7B:
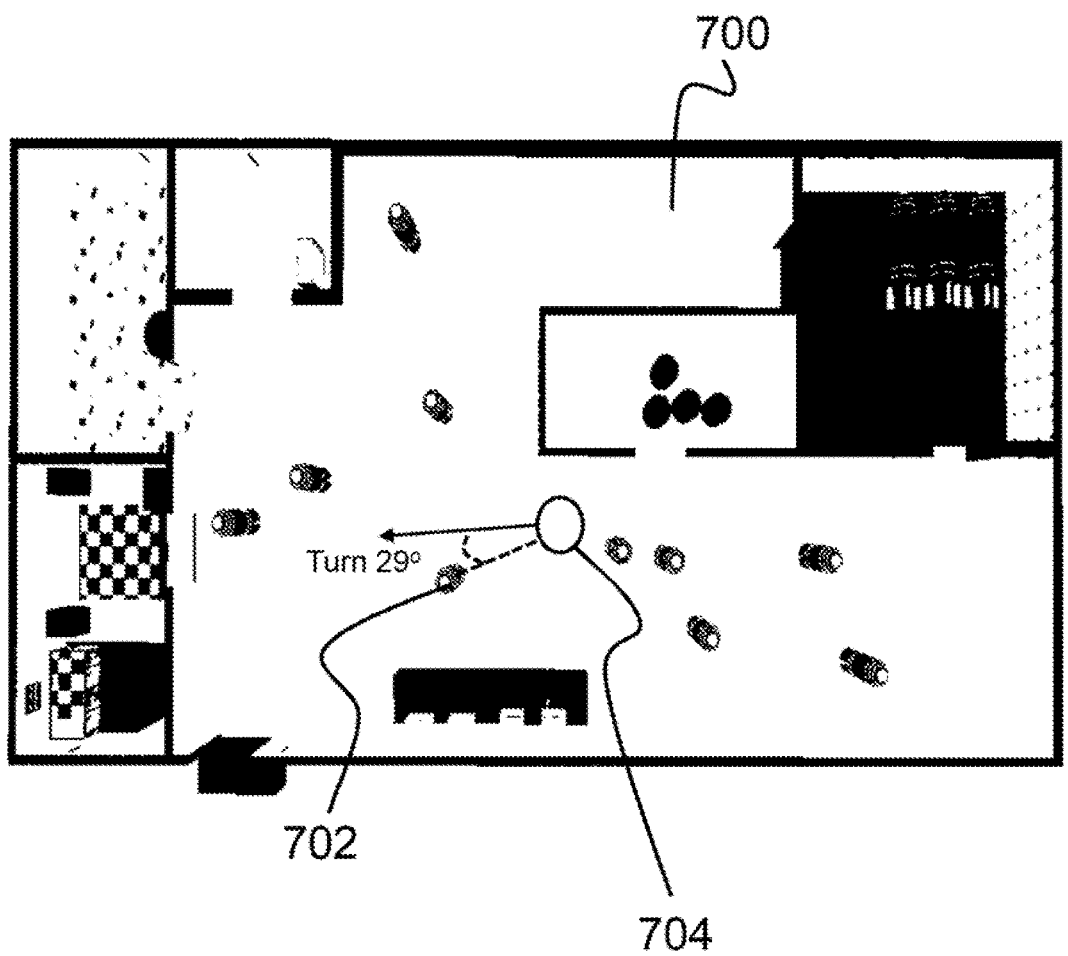
FIG. 7B is snapshot of the flight simulation.

In addition to the evaluation with a cart, the process was also tested using simulation in the ROS gazebo environment (See Literature Reference No. 7). FIG. 7A, for example, depicts a top-down view of a simulated warehouse 700 that has some artificial obstacles 702. A UAV 704 (the quadcopter in the lower left area in the warehouse) was simulated to explore the warehouse 700 randomly in a free manner while avoiding obstacles 702 like walls, chests, bombs, etc. FIG. 7B shows a snapshot where the UAV 704 was commanded to turn because an obstacle 702 was detected in front of the UAV. During experiments, the simulation could run for hours without the UAV 704 crashing into obstacles, which verified the effectiveness of the process for obstacle avoidance as described herein.

The process for finding open space was integrated with a navigation control system and tested on real UAVs. Both a customized UAV called Safeflight (See Literature Reference No. 8) and a commercial off the shelf UAV (See Literature Reference No. 9) from 3D Robotics were used. During testing on actual UAVs, the system detected an obstacle in front of the UAV and commanded the UAV to shift left or right to avoid the obstacle. In dozens of live tests, the processes were observed to be working robustly and sent out the correct commands to the control module to cause the UAV to maneuver around the obstacle.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for finding open space for mobile platform exploration, the system comprising:
one or more processors and a memory, the memory being a non-transitory computer-readable medium having executable instructions encoded thereon, such that upon execution of the instructions, the one or more processors perform operations of:
designating a straight forward direction in front of a sensor center as a default moving direction;
determining if a filtered three-dimensional (3D) point cloud has a sufficient number of cloud points for further processing;
if the filtered point cloud has an insufficient number of cloud points, then determining if an obstacle is too close in a previous K time, such that if so, a backward direction is set as a target direction and if not, then the straight forward direction is set as the target direction;
if the filtered point cloud does have a sufficient number of cloud points, then continuing;
calculating a distance $d_c$ of each point to the sensor center;
determining if a number of times M that distance $d_c$ is smaller than a distance threshold $D_{min}$ is greater than a fixed number $K_1$;
if M is greater than the fixed number $K_1$, then the backward direction is set as the target direction;
if M is smaller than the fixed number $K_1$, then continuing;
estimating an openness of each candidate direction until a candidate direction is designated as open and set as the target direction or all candidate directions have been checked for openness, with the backward direction being set as the target direction; and
causing the mobile platform to move in the target direction.

2. The system as set forth in claim 1, wherein estimating the openness of each candidate direction further comprises operations of:
calculating a minimum distance $d_{min}$ of the cloud points to a directional vector;
determining if $d_{min}$ is smaller than a distance threshold r;
if $d_{min}$ is greater than the distance threshold r, then the candidate direction is designated as open and set as the target direction;
if $d_{min}$ is smaller than the distance threshold r, then the candidate direction is designated as blocked and continuing;
determining if all candidate directions have been checked for openness;
if all candidate directions have not been checked for openness, then continuing estimating openness until a candidate direction is designated as open and set as the target direction or all candidate directions have been checked for openness; and
if all candidate directions have been checked for openness, then setting the backward direction as the target direction.

3. The system as set forth in claim 2, wherein estimating the openness of each candidate direction, the candidate directions are estimated in an order of [0°, −1°, 1°, −2°, 2°, . . . , −$\Theta_{max}$, $\Theta_{max}$], where an angular separation is 1° to find a next candidate direction.

4. The system as set forth in claim 3, wherein in determining if $d_{min}$ is smaller than the distance threshold r, the distance threshold r is a radius as measured across the mobile platform.

5. The system as set forth in claim 4, further comprising an operation of generating the filtered 3D point cloud.

6. The system as set forth in claim 5, wherein generating the filtered 3D point cloud further comprises operations of:

filtering a raw 3D point cloud according to vertical coordinates in a sensor coordinate system such that any 3D point whose vertical coordinates are beyond a predetermined range are filtered out, resulting in vertically filtered 3D points;

filtering the vertically filtered 3D points based on a distance to the sensor center, such that 3D points having a distance above a maximum distance $T_1$ are filtered out, resulting in vertically and distance filtered 3D points; and filtering the vertically and distance filtered 3D points based on voxel grid filtered, resulting in the filtered 3D point cloud.

7. The system as set forth in claim 2, wherein in determining if $d_{min}$ is smaller than the distance threshold r, the distance threshold r is a radius as measured across the mobile platform.

8. The system as set forth in claim 1, further comprising an operation of generating the filtered 3D point cloud.

9. The system as set forth in claim 8, wherein generating the filtered 3D point cloud further comprises operations of:

filtering a raw 3D point cloud according to vertical coordinates in a sensor coordinate system such that any 3D point whose vertical coordinates are beyond a predetermined range are filtered out, resulting in vertically filtered 3D points;

filtering the vertically filtered 3D points based on a distance to the sensor center, such that 3D points having a distance above a maximum distance $T_1$ are filtered out, resulting in vertically and distance filtered 3D points; and filtering the vertically and distance filtered 3D points based on voxel grid filtered, resulting in the filtered 3D point cloud.

10. The system as set forth in claim 1, wherein estimating the openness of each candidate direction, the candidate directions are estimated in an order of $[0°, -1°, 1°, -2°, 2°, \ldots, -\Theta_{max}, \Theta_{max}]$, where an angular separation is 1° to find a next candidate direction.

11. A method for finding open space for mobile platform exploration, the method comprising an act of causing one or more processors to execute instructions encoded on a non-transitory computer-readable medium, such that upon execution of the instructions, the one or more processors perform acts of:

designating a straight forward direction in front of a sensor center as a default moving direction;

determining if a filtered three-dimensional (3D) point cloud has a sufficient number of cloud points for further processing;

if the filtered point cloud has an insufficient number of cloud points, then determining if an obstacle is too close in a previous K time, such that if so, a backward direction is set as a target direction and if not, then the straight forward direction is set as the target direction;

if the filtered point cloud does have a sufficient number of cloud points, then continuing;

calculating a distance $d_c$ of each point to the sensor center;

determining if a number of times M that distance $d_c$ is smaller than a distance threshold $D_{min}$ is greater than a fixed number $K_1$;

if M is greater than the fixed number $K_1$, then the backward direction is set as the target direction;

if M is smaller than the fixed number $K_1$, then continuing;

estimating an openness of each candidate direction until a candidate direction is designated as open and set as the target direction or all candidate directions have been checked for openness, with the backward direction being set as the target direction; and causing the mobile platform to move in the target direction.

12. The method as set forth in claim 11, wherein estimating the openness of each candidate direction further comprises acts of:

calculating a minimum distance $d_{min}$ of the cloud points to a directional vector;

determining if $d_{min}$ is smaller than a distance threshold r;

if $d_{min}$ is greater than the distance threshold r, then the candidate direction is designated as open and set as the target direction;

if $d_{min}$ is smaller than the distance threshold r, then the candidate direction is designated as blocked and continuing;

determining if all candidate directions have been checked for openness;

if all candidate directions have not been checked for openness, then continuing estimating openness until a candidate direction is designated as open and set as the target direction or all candidate directions have been checked for openness; and if all candidate directions have been checked for openness, then setting the backward direction as the target direction.

13. The method as set forth in claim 12, wherein in determining if $d_{min}$ is smaller than the distance threshold r, the distance threshold r is a radius as measured across the mobile platform.

14. The method as set forth in claim 11, further comprising an operation of generating the filtered 3D point cloud.

15. The method as set forth in claim 14, wherein generating the filtered 3D point cloud further comprises operations of:

filtering a raw 3D point cloud according to vertical coordinates in a sensor coordinate method such that any 3D point whose vertical coordinates are beyond a predetermined range are filtered out, resulting in vertically filtered 3D points;

filtering the vertically filtered 3D points based on a distance to the sensor center, such that 3D points having a distance above a maximum distance $T_1$ are filtered out, resulting in vertically and distance filtered 3D points; and filtering the vertically and distance filtered 3D points based on voxel grid filtered, resulting in the filtered 3D point cloud.

16. The method as set forth in claim 11, wherein estimating the openness of each candidate direction, the candidate directions are estimated in an order of $[0°, -1°, 1°, -2°, 2°, \ldots, -\Theta_{max}, \Theta_{max}]$, where an angular separation is 1° to find a next candidate direction.

17. A computer program product for finding open space for mobile platform exploration, the computer program product comprising:

a non-transitory computer-readable medium having executable instructions encoded thereon, such that upon execution of the instructions by one or more processors, the one or more processors perform operations of:

designating a straight forward direction in front of a sensor center as a default moving direction;

determining if a filtered three-dimensional (3D) point cloud has a sufficient number of cloud points for further processing;
  if the filtered point cloud has an insufficient number of cloud points, then determining if an obstacle is too close in a previous K time, such that if so, a backward direction is set as a target direction and if not, then the straight forward direction is set as the target direction;
  if the filtered point cloud does have a sufficient number of cloud points, then continuing;
calculating a distance $d_c$ of each point to the sensor center;
determining if a number of times M that distance $d_c$ is smaller than a distance threshold $D_{min}$ is greater than a fixed number $K_1$;
  if M is greater than the fixed number $K_1$, then the backward direction is set as the target direction;
  if M is smaller than the fixed number $K_1$, then continuing;
estimating an openness of each candidate direction until a candidate direction is designated as open and set as the target direction or all candidate directions have been checked for openness, with the backward direction being set as the target direction; and
causing the mobile platform to move in the target direction.

18. The computer program product as set forth in claim 17, wherein estimating the openness of each candidate direction further comprises operations of:
  calculating a minimum distance $d_{min}$ of the cloud points to a directional vector;
  determining if $d_{min}$ is smaller than a distance threshold r;
    if $d_{min}$ is greater than the distance threshold r, then the candidate direction is designated as open and set as the target direction;
    if $d_{min}$ is smaller than the distance threshold r, then the candidate direction is designated as blocked and continuing;
  determining if all candidate directions have been checked for openness;
    if all candidate directions have not been checked for openness, then continuing estimating openness until a candidate direction is designated as open and set as the target direction or all candidate directions have been checked for openness; and
    if all candidate directions have been checked for openness, then setting the backward direction as the target direction.

19. The computer program product as set forth in claim 18, wherein in determining if $d_{min}$ is smaller than the distance threshold r, the distance threshold r is a radius as measured across the mobile platform.

20. The computer program product as set forth in claim 17, further comprising an operation of generating the filtered 3D point cloud.

21. The computer program product as set forth in claim 20, wherein generating the filtered 3D point cloud further comprises operations of:
  filtering a raw 3D point cloud according to vertical coordinates in a sensor coordinate computer program product such that any 3D point whose vertical coordinates are beyond a predetermined range are filtered out, resulting in vertically filtered 3D points;
  filtering the vertically filtered 3D points based on a distance to the sensor center, such that 3D points having a distance above a maximum distance $T_1$ are filtered out, resulting in vertically and distance filtered 3D points; and
  filtering the vertically and distance filtered 3D points based on voxel grid filtered, resulting in the filtered 3D point cloud.

22. The computer program product as set forth in claim 17, wherein estimating the openness of each candidate direction, the candidate directions are estimated in an order of $[0°, -1°, 1°, -2°, 2°, \ldots, -\Theta_{max}, \Theta_{max}]$, where an angular separation is 1° to find a next candidate direction.

\* \* \* \* \*